United States Patent [19]
Gillon et al.

[11] Patent Number: 5,764,738
[45] Date of Patent: Jun. 9, 1998

[54] DOCUMENT DISTRIBUTION SYSTEM

[75] Inventors: Alexander Carlyle Gillon, Aberdeen; Francis Xavier Lukas, Middletown; Reuel Reynaud Robertson, Matawan, all of N.J.

[73] Assignee: AT&T Corp, Middletown, N.J.

[21] Appl. No.: 59,004

[22] Filed: May 7, 1993

Related U.S. Application Data

[63] Continuation of Ser. No. 423,518, Oct. 13, 1989, abandoned, which is a continuation of Ser. No. 112,912, Oct. 23, 1987, abandoned.

[51] Int. Cl.$^6$ .................... H04M 11/00; H04N 1/21
[52] U.S. Cl. .................. 379/100.11; 379/100.01; 358/403; 358/407
[58] Field of Search ............ 379/100, 100.11, 379/100.01, 100.08, 100.09, 100.15; 358/280, 401, 402, 403, 404, 405, 443, 448, 407

[56] References Cited

U.S. PATENT DOCUMENTS

| | | | |
|---|---|---|---|
| 4,340,783 | 7/1982 | Sugiyama et al. | 379/100 |
| 4,419,697 | 12/1983 | Wada | 379/100 |
| 4,741,021 | 4/1988 | Kotani et al. | 379/100 |
| 4,748,662 | 5/1988 | Hirata | 379/100 |
| 4,811,111 | 3/1989 | Kurokawa | 379/100 |
| 4,843,479 | 6/1989 | Yoshino et al. | 379/100 |
| 5,008,926 | 4/1991 | Misholi | 379/100 |

FOREIGN PATENT DOCUMENTS

| | | | |
|---|---|---|---|
| 57-152072 | 9/1982 | Japan | 379/100 |
| 0215163 | 12/1983 | Japan | 379/100 |
| 0119954 | 7/1984 | Japan | 379/100 |
| 59-214366 | 12/1984 | Japan | 379/100 |
| 62-132464 | 6/1987 | Japan | 379/100 |
| 2160072 | 12/1985 | United Kingdom | 379/100 |
| 2170075 | 7/1986 | United Kingdom | 379/100 |

OTHER PUBLICATIONS

Rosch, Winn L.; "PCs and Fax Get It Together"; PC Magazine; Jun. 23, 1987; pp. 255–274.

Kampen, H. Van; "Interconnection of The Teletex–, Telex– and other services"; *International Switching Symposium*; Sep. 1981.

"Flexible Facsimile Transmission"; Telecommunication; ITT Domestic Transmission Systems, Inc.; pp. 39–42.

"ITT Inaugurates Faxpak"; Business Communications Review; Nov.–Dec. 1979; pp. 29–31.

*Primary Examiner*—Lun-Yi Lao

[57] ABSTRACT

Printed or other pre-formed documents are delivered to requesters rapidly and at low cost by a microcomputer-based system which uses voice generation circuitry to invite a person calling in to the system to specify the document needed by pushing particular keys of his/her touch-tone telephone. Upon ascertaining the identity of the document in question, the computer transmits the document to the caller in standard facsimile form, either over the telephone connection already established if the telephone call was initiated from a telephone connected with a facsimile machine, or to a different telephone number specified by the caller.

10 Claims, 3 Drawing Sheets

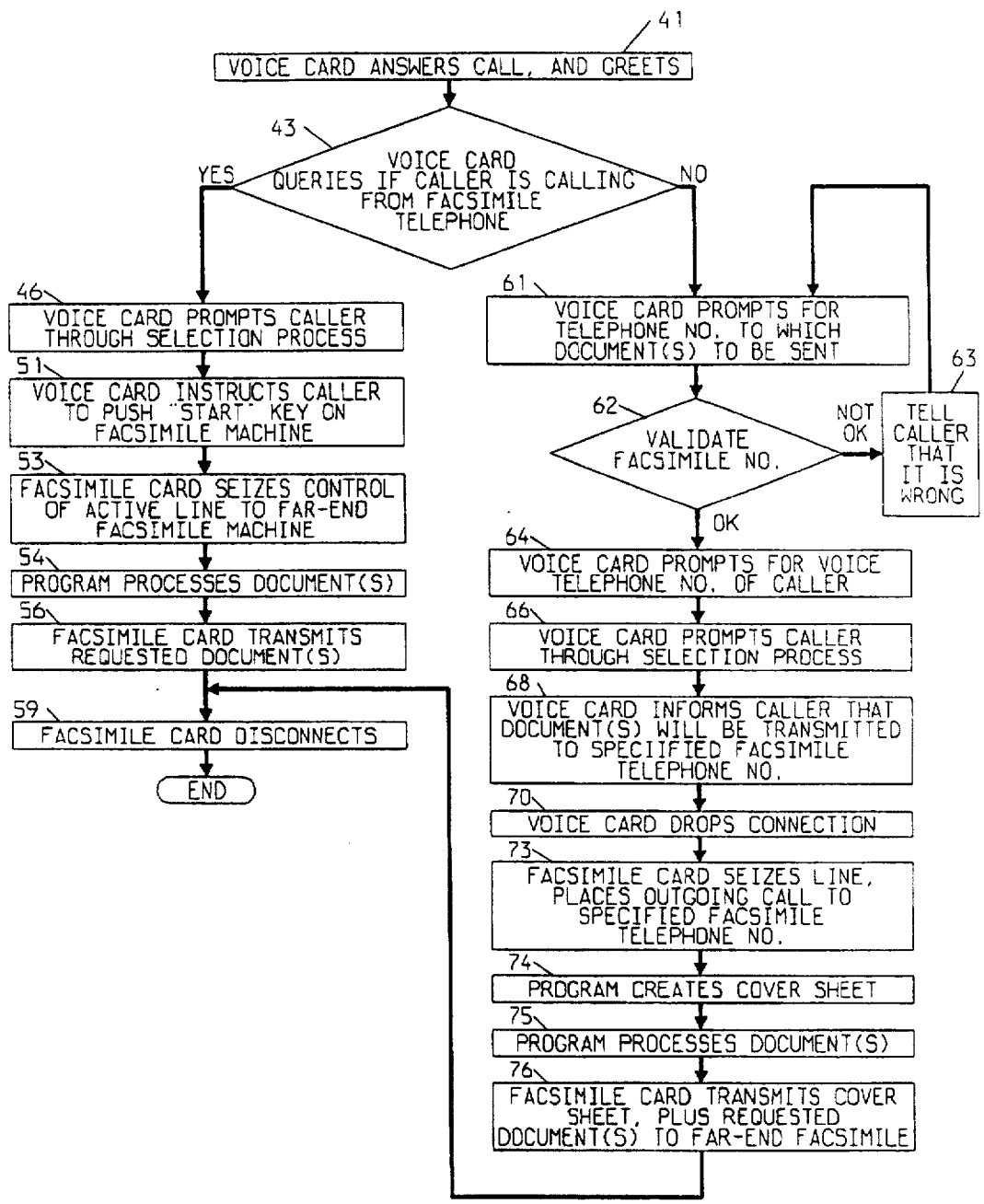

DOCUMENT DISTRIBUTION SYSTEM

This application is a continuation of application Ser. No. 07/423,518, filed on Oct. 13, 1989.

BACKGROUND OF THE INVENTION

The present invention relates to the transmission of images over telephone lines.

It is a common and oft-repeated circumstance of business and consumer life that one needs to obtain a printed document from a supplier of same. Such documents range from IRS forms to integrated circuit "spec" sheets to airline schedules. A typical such transaction begins when the person needing the documents telephones the business establishment or agency in question and, having been put in contact with an order clerk, salesman, etc, requests the needed document. Typically, the document is delivered to the requester via U.S. mail. When the requester is in a hurry, however, Express Mail, a commercial "overnight delivery" service or, perhaps, private messenger may be used. Such expedited delivery mechanisms are relatively expensive, however.

SUMMARY OF THE INVENTION

The present invention is directed to a system, which is illustratively microcomputer-based, for delivering printed or other pre-formed documents to requesters rapidly and at low cost. In particular, the requester dials a telephone number associated with the system. The latter uses voice generation circuitry to invite the requester, hereinafter the "caller", to specify the document needed, such as by pushing particular keys of his/her touch tone telephone. Upon ascertaining the identity of the document in question, the computer transmits the document to the caller in standard facsimile form.

Advantageously, if the telephone call was initiated from a telephone connected with a facsimile machine—a fact that the system may ascertain by querying the caller during the telephone transaction—the facsimile data is communicated over the telephone connection already established. If, on the other hand, the telephone call was initiated from a telephone that is not connected with a facsimile machine, then, in preferred embodiments of the invention and in accordance with a feature thereof, the caller is prompted to enter the telephone number of a facsimile machine to which the requested document can be sent and the document is then sent there.

In accordance with a further feature of the invention, when the document is to be sent to a facsimile machine other than one connected with the caller's telephone, the caller may also be prompted for caller-identifying data, such as his/her telephone number. This data is supplied by the system with the requested document—preferably on a separate cover sheet—thereby enabling an attendant at the receiving facsimile machine to identify the intended recipient.

BRIEF DESCRIPTION OF THE DRAWING

In the drawing,

FIG. 3 is a flowchart of the processing performed by software within the system of FIG. 1.

DETAILED DESCRIPTION

Figure 1:
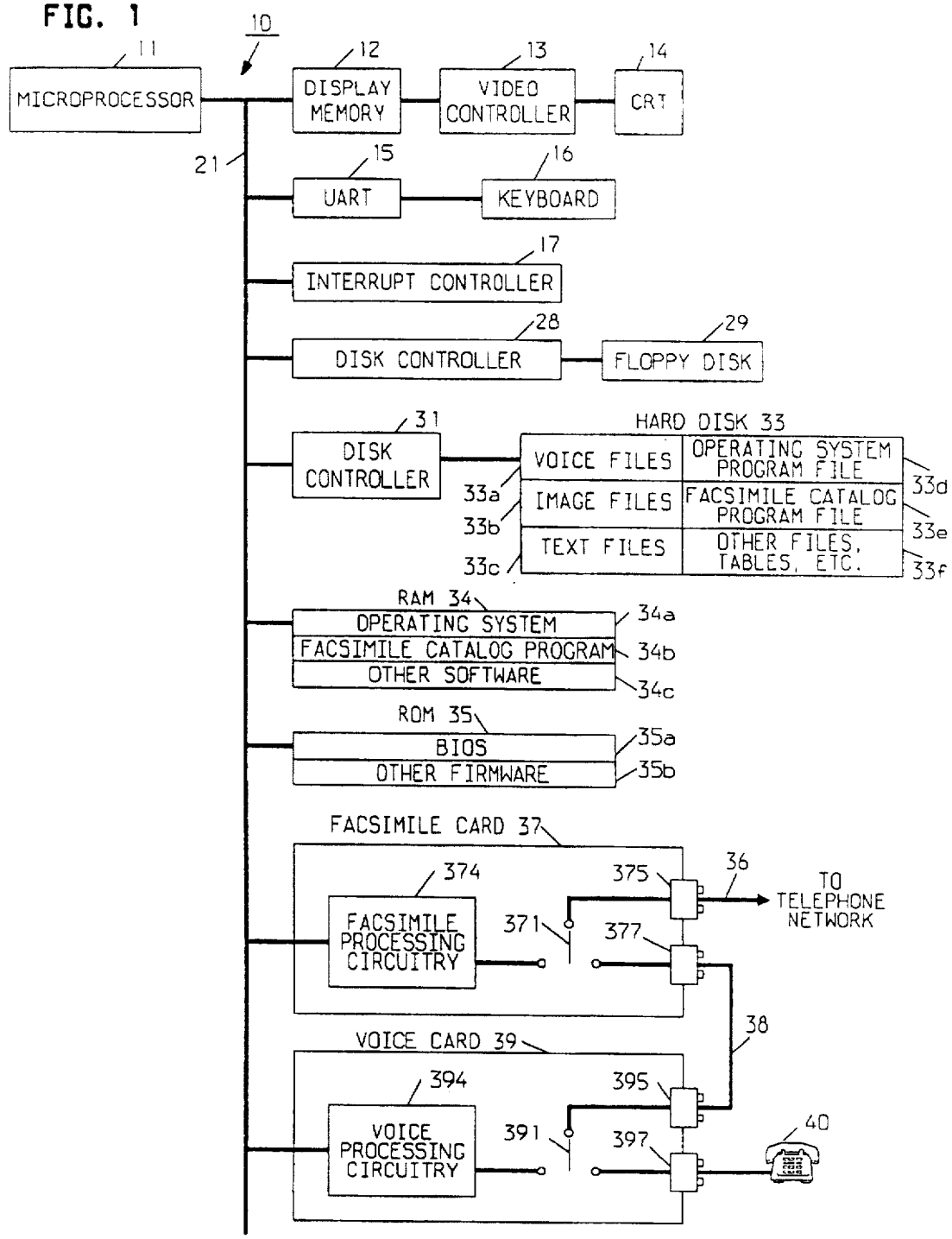
FIG. 1 is a block diagram of a microcomputer system embodying the principles of the present invention.

System 10 of FIG. 1 is based around a standard microcomputer and commercially available special-purpose circuit cards and provides individuals who call into the computer with a catalog service—specifically, in this example, the ability to request "spec" sheets for integrated circuits.

The system is illustratively based on an AT&T Model PC6300 personal computer, at the heart of which is a microprocessor 11 having address, data and control buses denoted generically as bus 21. Connected to bus 21 are a display memory 12 whose contents are used by a video controller 13 to generate video signals for a CRT 14; a universal asynchronous receiver transmitter (UART) 15, which serves as a serial interface between microprocessor 11 and a keyboard 16; an interrupt controller 17, to which hardware interrupt leads (not shown) extend, inter alia, from UART 15; a floppy disk controller 28, which serves as an interface between microprocessor 11 and a floppy disk memory 29 and a hard disk controller 31, which serves as an interface between microprocessor 11 and hard disk memory 33. The latter holds, inter alia, voice, image and text files 33a, 33b and 33c, respectively, as discussed in further detail hereinbelow; a copy of the workstation's operating system 33d—illustratively the MS-DOS® operating system; a copy of an application module, herein referred to as "facsimile catalog program" 33e, which, when executing, controls the system hardware in accordance with the invention; and a number of other files not here relevant indicated at 33f.

Also connected to bus 21 is random access memory (RAM) 34 and read-only memory (ROM) 35. When the system is in operation, RAM 34 holds the executed copies of a) the operating system, indicated as 34a, and b) facsimile catalog program, indicated as 34b, and c) other software not here relevant, indicated as 34c. ROM 35 contains the conventional Basic Input/Output System (BIOS) 35a as well as other firmware 35b.

Also connected to bus 21 are two circuit cards that play a central role in implementing the invention. One of these is voice card 39 which may be, for example, the card marketed by Natural Microsystems under the name WATSON. As called out in the drawing, voice card 39 includes input and output connectors 395 and 397, respectively, a switch 391 and voice processing circuitry 394, the latter comprising all the other circuitry on the card. When in one position, switch 391 simply interconnects connector 395 and 397, thereby providing a direct path through the card. When in its other position, switch 391 connects input connector 395 to the voice processing circuitry.

Voice card 39 has a number of capabilities. Among the capabilities relevant here are the ability to a) recognize touch tone inputs and report the identity of the digit or symbol represented thereby onto bus 21 and b) to re-create human speech from digitally stored versions thereof supplied from the bus and to output that speech to connector 395.

The other of the aforementioned circuit cards is facsimile card 37, illustratively the FAXCON-20 facsimile communication board available from AT&T. Similar to voice card 39, facsimile card 37 includes input and output connectors 375 and 377, respectively, a switch 371 and facsimile processing circuitry 374, the latter comprising all the other circuitry on the card. Among the capabilities of facsimile card 37 relevant here is the ability to accept files containing text and/or image data, convert that data into facsimile images and supply it, when switch 371 is appropriately thrown, to connector 375 using standard facsimile formats and protocols.

Circuit cards 37 and 39 are interconnected by way of a jumper able 38 which connects facsimile card output connector 377 to voice card input connector 395. In addition, a telephone line 36 is connected to facsimile card input connector 375 and a standard telephone set 40 is connected to voice card output connector 397.

When the system is in an idle state, switch 371 within card 37 is set so as to interconnect facsimile card connectors 375 and 377 while switch 391 within card 39 is set so as to interconnect voice card connectors 395 and 397. Thus prior to the receipt of any telephone call, telephone line 36 is directly connected through both cards to telephone set 40.

Figure 2:
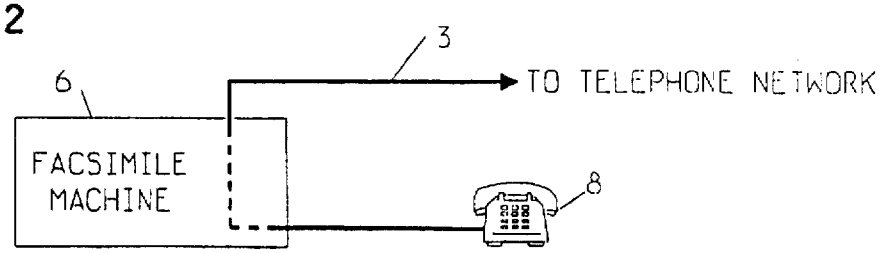
FIG. 2 is a block diagram of a standard facsimile machine station from which documents can be requested from the system of FIG. 1.

Turning now to FIGS. 2 and 3, the facsimile station depicted in FIG. 2 is seen to comprise a standard facsimile machine 6 having connected thereto a standard touch-tone telephone 8 and a conventional telephone line 3 which extends into the public dialed network. When a person at telephone 8 wishes to be availed of the catalog service provided by system 10, he/she dials the telephone number associated with telephone 40. Having been instructed by facsimile catalog program 34b, which is now in control of the system, to be monitoring the incoming line, voice card 39 recognizes the ringing voltage and, as indicated at 41 of FIG. 3, answers the call. It does this, specifically, by causing its switch 391 to connect voice processing circuitry 394 to connector 395 and thence to the telephone line back through facsimile card 37. (Although not shown in the FIG., voice processing circuitry 394 has an internal connection to connector 395 that enables it to monitor the signals applied thereto, such as ringing voltage.)

Facsimile catalog program 34b at this point operates voice card 39 to deliver a sequence of messages to the caller. In each case, the message is delivered by instructing the operating system 34a to retrieve one of voice files 33a from hard disk 33 and route the file via bus 21 to voice processing circuitry 394 of voice card 39. The voice processing circuitry converts this file into audible speech which is thereupon transmitted to the caller via the telephone line.

System 10 illustratively provides to requesters "spec" sheets for integrated circuits manufactured by the (fictitious) XYZ Microchip Corporation, and, as further indicated at 41, the first message is a greeting, illustratively the greeting "You have reached the XYZ Microchip Corporation automated facsimile catalog." This is immediately followed by a second message, again delivered to the voice card via the above-outlined mechanism. As indicated at 43, this second message queries as to whether the caller is calling from a facsimile telephone, i.e., a telephone associated with a facsimile machine, the message illustratively being, "Touch '1' on your touch-tone telephone if you are calling from a facsimile telephone; otherwise touch any other key." The program now instructs the voice card to be receptive to an answering touch-tone input from the caller. The voice card, being capable of recognizing touch tone inputs, provides facsimile catalog program 34b with an indication of the caller's response.

Since in the present example, telephone 8 is, in fact, associated with a facsimile machine, the caller will touch "1" at this time. The program thereupon proceeds to step 46 at which it prompts the caller through a selection process so as to elicit from the caller what specific information the caller wishes to receive. This process may involve several queries and responses, allowing the caller to be increasingly specific with respect to the desired information.

A typical such interaction might be:

| | |
|---|---|
| FAX CATALOG: | Touch '1' for information on digital integrated circuits; touch '2' for information on analog integrated circuits. |
| USER: | [Enters '1']. |
| FAX CATALOG: | Touch '1' for 74LS series devices; touch '2' for 74LP series devices. |
| USER: | [Enters '1']. |
| FAX CATALOG: | Enter the 4-digit code of the device that you are interested in. |
| USER: | [Enters '7522']. |

(In some applications, the caller may make selections based on information previously disseminated by the supplier, such as a printed index of available documents.)

As indicated at 51, facsimile catalog program 34b now causes the voice card to instruct the caller to now operate the "START" key on the facsimile machine with which the caller's telephone is associated. To this point, facsimile machine 6 has been providing a signal path from telephone line 3 facsimile machine 6 directly through to telephone 8. However, responsive to the operation of the "START" key, facsimile machine 6 now disconnects telephone 8 from the line and connects the line to the internal facsimile circuitry of the machine. There should not be any source documents in the input tray of the caller's facsimile machine. Accordingly, the latter assumes the role of recipient in the upcoming facsimile transaction.

After a preprogrammed delay to allow the caller to comply with the instruction to operate the "START" key, facsimile catalog program 34b instructs facsimile card 37 to now operate its switch 371, causing facsimile card 37 to seize control of the active, already established telephone connection to the far-end facsimile machine, as indicated at 53. At this point, there is a direct telephone connection between facsimile circuitry 374 in facsimile card 37 and the facsimile circuitry in the caller's facsimile machine.

As also indicated at 53, facsimile card 37 now negotiates with facsimile machine 6, in the standard way, such parameters as line speed, transmission protocols and transmitter/receiver identity. Upon successful completion of these negotiations, facsimile card 37 notifies facsimile catalog program 34b of this fact. Proceeding then to step 54, the program then processes the requested document(s)—in this case the "spec" sheet for the "7522" microchip—in preparation for transmission to facsimile machine 6. In particular, it instructs the operating system to retrieve from hard disk 33 one or more of either image files 33b or text files 33c. These files contain the text and/or graphic images which comprise the document(s) that the caller has requested. In particular, each image file contains a document, or portion thereof, in bit-mapped form and, as such, is directly transmittable by facsimile card 37. A text file, by contrast, contains standard ASCII characters and must be converted by facsimile catalog program 34b to a bit-mapped form before being sent to the facsimile card. A particular document or package of documents may be stored as either an image file, a text file, or some combination of files to be assembled by the facsimile catalog program.

The various image files may be files that were, for example, created by scanning paper copies of documents through an electronic scanner (not shown) connected to the system; received from a remote location by facsimile transmission; or created on a frame creation system such as the AT&T PC Image Director® system. The text files may be files that were, for example, created from keyboard 16 or received from a remote location via a data communications link.

Having assembled the document(s) requested by the caller and, if necessary, converted them to bit-mapped form, facsimile catalog program 34b delivers them to facsimile card 37 via bus 21. Facsimile processing circuitry 374 converts these bit maps into facsimile images in accordance with the negotiated parameters. As indicated at 56, the resulting facsimile images are thereupon transmitted to the caller's facsimile machine 8 via the telephone network, using standard facsimile protocols such as CCITT Group III.

Having completed the facsimile transmissions, facsimile catalog program 34b then instructs facsimile card 37 to disconnect from the telephone line, as indicated at 59. The operation thus comes to an end, with the program now instructing facsimile and voice cards to assume their previous idle states.

Returning, now, to step 43, let us now assume that the caller is not at a telephone associated with a facsimile machine and therefore touches a key other than "1" in response to the step 43 prompt. Facsimile catalog program 34b thereupon proceeds to step 61 at which, in accordance with a feature of the invention, it prompts the caller for the telephone number of the facsimile machine to which the caller wishes to have the documents transmitted. As indicated at 62, the program validates the entered number, illustratively by verifying that it appears to be a valid telephone number; checking for the presence of an area code; stripping off the area code if it is the same as the area code of telephone line 36; and prepending an outside calling dialing code, such as "9", to the number in cases where telephone line 36 extends from a PBX. If any of these validation checks fail, the program so informs the caller, as indicated at 63, and then returns to step 61 to re-prompt the caller for the desired number.

(Similar validation checks may be provided, as desired, at various stages of the call, such as during the eliciting of the identity of the desired document at step 46 described above.)

Once the caller has supplied an apparently valid number, the program proceeds to step 64, where, for a purpose discussed hereinbelow, it prompts the caller for caller-identifying data, illustratively his/her voice telephone number, i.e., the number at which the caller receives his/her normal telephone calls.

As indicated at 66, the system now prompts the caller through a selection process similar to that carried out a step 46 in order to elicit from the caller what specific information the caller wishes to receive. The program then causes the voice card to inform the caller, at step 68, that the requested document(s) will be transmitted to the previously supplied facsimile telephone number and causes voice card 39 to disconnect from telephone line 36 by operating switch 391, as indicated at step 70.

After waiting a brief period of time, illustratively 2–3 seconds, to assure that the previously established telephone connection has been dropped, facsimile catalog program 34b, at step 73, instructs facsimile card 37 to seize telephone line 36 and place a new, outgoing telephone call to the facsimile number just supplied by the caller. This is accomplished by first having the facsimile card operate switch 371 to connect telephone line 36 to facsimile processing circuitry 374, and then having the latter dial the number. If the called facsimile number is busy or does not answer, the facsimile catalog program will wait a predetermined period of time, illustratively five minutes, and then initiate one or more retries.

Facsimile catalog program 34b now creates, at step 74, a cover sheet for the document(s) about to be transmitted. It does this by instructing the operating system to retrieve a cover sheet template, stored as one of text files 33c in hard disk 33, and modifying it to include the facsimile telephone number and caller's voice telephone number both previously supplied by the caller. As in the prior case, the program, at step 75, a) instructs the operating system to retrieve one or more of either image files 33b or text files 33c from hard disk 33, b) processes them as needed and c) and supplies them along with the cover sheet via bus 21 to facsimile card 37 for transmission. The facsimile card thereupon transmits them, as indicated at 76 and, once again at step 59, facsimile catalog program 34b instructs facsimile card 37 to disconnect from the telephone line and assume its previously idle state.

Figure 4:
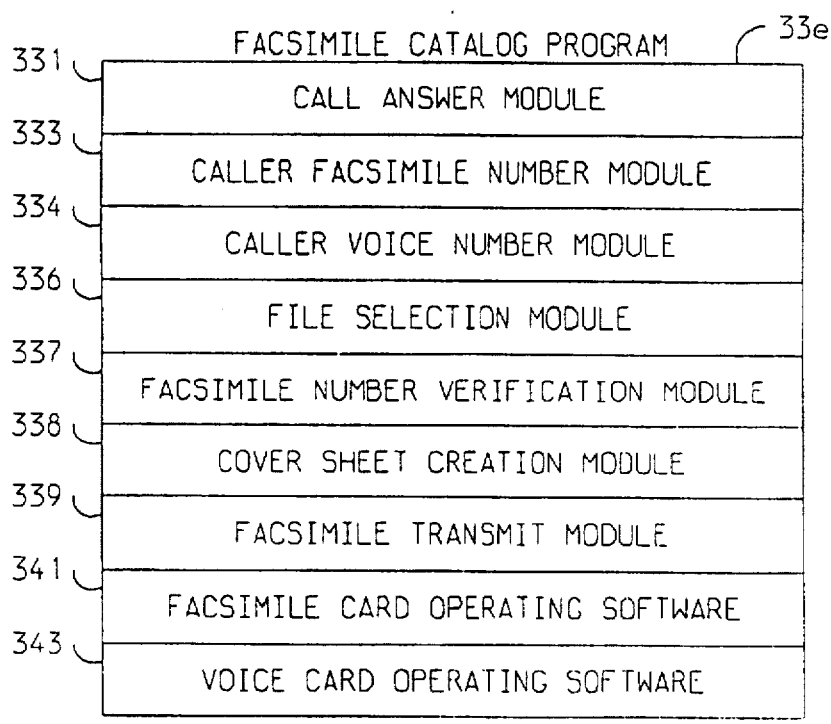
FIG. 4 is a memory map of a region of the hard disk used in the system of FIG. 1

FIG. 4 is a memory map of that region of hard disk 33 that holds the "permanent" copy of the facsimile catalog program, denoted 33e, as previously discussed. As shown therein, the program includes a number of identifiable modules, copies of which comprise the executed copy of the program stored in RAM 34. The principal functions of these modules are as follows:

| Module Name and Number | Principal Function and Corresponding Flowchart Steps |
| --- | --- |
| Call Answer 331 | initial telephone call processing (steps 41, 43) |
| Caller Facsimile Number 333 | obtaining caller's facsimile number (61) |
| Caller Voice Number 334 | obtaining caller's voice number (64) |
| File Selection 336 | eliciting identity, and processing, of desired documents (46, 51, 66, 68, 70) |
| Facs. Num. Verification 337 | validating facsimile number (62, 63) |
| Cover Sheet Creation 338 | creating cover sheet (74) |
| Facsimile Transmit 330 | transmitting the requested document(s) (53, 54, 56, 59, 73, 75, 76) |

Two other modules within the facsimile card program are facsimile card operating software 341 and voice card operating software 343. These modules are supplied by the vendor(s) of the cards themselves and control the card hardware in response to commands from the above-listed software modules. And it will, of course, be appreciated that the executing copy of the facsimile catalog program in RAM 34 is comprised of copies of the modules shown in FIG. 4.

The preceding merely illustrates the principles of the invention. For example, although the invention has been disclosed in the context of a particular hardware configuration, other hardware configurations providing the same functionality may be used. In addition, although the caller inputs are illustratively provided via the operation of the keys of a touch-tone telephone, it may be desired to provide the system with, for example, voice-recognition circuitry which allows the caller to provide spoken inputs instead. In addition, although the presently disclosed system maintains the image and text files in local storage, it may be desired—particularly if there is a large volume of requestable information—to store that information on a larger system and have the local system, i.e., the system interacting with the caller, request and have downloaded the information when it is needed. And in other straightforward variations, the system may be configured to handle multiple calls and document requests on a time-shared or parallel processing basis. It may also be arranged to provide the caller with the opportunity to make multiple document requests in the same transaction with the system. Additionally, it will be appreciated that the documents supplied by the system may be of the type that changes fairly frequently, such as real estate listings, as compared to documents which do not, such as IRS forms. Moreover, in some implementations, access to highly confidential documents may be restricted by requesting the caller to enter a security password or voice sample prior to providing the caller with the documents.

It will thus be appreciated that those skilled in the art will be able to devise numerous arrangements which, although not explicitly shown or described herein, embody the principles of the invention and are within its spirit and scope.

What is claimed is:

1. A method for distributing, on request, copies of predefined graphic image documents stored in bit-mapped form in individual computer files, said method comprising the machine-implemented steps of answering a telephone call made over a telephone line to complete telephone connection from a caller at the far end of said connection, providing to said caller machine-originated voice signals instructing said caller relative to the ordering of copies of one or more of said predefined graphic image documents stored in bit-mapped form, receiving from said caller responses to said instructions and determining from said responses the identify of a specific one of said predefined graphic image documents stored in bit-mapped form, determining whether a facsimile machine is connected at said caller's end of said caller's connection, and retrieving said specific graphic image document stored in bit-mapped form from the respective computer file and transmitting it in facsimile form over said telephone line during said caller's telephone call if it has been determined that a facsimile machine is connected at said caller's end of said caller's connection.

2. A method for distributing, on request, copies of documents stored in machine-readable form, said method comprising the machine-implemented steps of answering a telephone call made over a telephone line to complete a telephone connection from a caller at the far end of said connection, providing to said caller machine-originated voice signals instructing said caller relative to the ordering of copies of one or more of said documents, receiving from said caller responses to said instructions and determining from said responses the identity of a specific one of said documents, retrieving said one of said documents from storage, determining whether a facsimile machine is connected at said caller's end of said caller's telephone connection, providing to said caller computer-originated instructions relative to the specification of information identifying a facsimile machine to which the retrieved document is to be transmitted when it has been determined that a facsimile machine is not connected at said caller's end of said caller's telephone connection, receiving from said caller responses to those instructions, transmitting the retrieved document in facsimile form over said telephone line during said caller's telephone call if it has been determined that a facsimile machine is connected at said caller's end of said caller's telephone connection, and initiating a second telephone call to said facsimile machine telephone number to establish thereto a second telephone connection and transmitting the retrieved document in facsimile form over said telephone connection when it has been determined that a facsimile machine is not connected at said caller's end of said caller's telephone connection.

3. The invention of claim 2 comprising the further machine-implemented steps, to be performed when it has been determined in said determining step that a facsimile machine is not connected at said caller's end of said caller's telephone connection, of determining the identity of said caller, and transmitting information identifying said caller along with the retrieved document.

4. Apparatus comprising, memory means for storing a plurality of predefined graphic image documents in bit-mapped form in individual computer files, means for answering a telephone call made over a telephone line connected to said apparatus to complete a telephone connection from a caller at the far end of said connection and for providing to said caller machine-originated voice signals instructing said caller relative to the ordering of copies of one or more of said predefined graphic image documents stored in bit-mapped form, means for receiving from said caller responses to said instructions and for identifying from said responses a specific one of said predefined graphic image documents stored in bit-mapped form, and means for retrieving said specific one of said graphic image documents stored in bit-mapped form from the respective computer file, means for determining whether a facsimile machine is connected at said caller's end of said caller's telephone connection, and means operative when it has been determined that a facsimile machine is connected at said caller's end of said caller's telephone connection for transmitting the retrieved specific one of said graphic image documents in facsimile form over said caller's telephone connection to said facsimile machine at said caller's end.

5. Apparatus comprising, memory means for storing a plurality of documents in machine-readable form, means for answering a telephone call made over a telephone line connected to said apparatus to complete a telephone connection from a caller at the far end of said connection and for providing to said caller machine-originated voice signals instructing said caller relative to the ordering of copies of one or more of said documents, means for receiving from said caller responses to said instructions and for identifying from said responses a specific one of said documents, means for retrieving said specific one of said documents from said memory means, means for determining whether a facsimile machine is connected at said caller's end of said caller's telephone connection, and means operative when it has been determined that a facsimile machine is connected at said caller's end of said caller's telephone connection for transmitting the retrieved document in facsimile form over said caller's telephone connection to said facsimile machine at said caller's end.

6. Apparatus comprising, memory means for storing a plurality of documents in machine-readable form, means for answering a telephone call made over a telephone line connected to said apparatus to complete a telephone connection from a caller at the far end of said connection and for providing to said caller machine-generated voice signals instructing said caller relative to the ordering of copies of one or more of said documents, means for receiving from said caller responses to said instructions and for identifying from said responses a specific one of said documents, means for retrieving said specific one of said documents from said memory means, means for determining whether a facsimile machine is connected at said caller's end of said caller's telephone connection, means operative when it has been determined that a facsimile machine is connected at said caller's end of said caller's telephone connection for transmitting the retrieved document in facsimile form over said telephone line during said caller's telephone call, means operative when it has been determined that a facsimile machine is not connected at said caller's end of said caller's telephone connection for providing to said caller voice instructions relative to the specification of information identifying a facsimile machine to which the requested document is to be transmitted, and for receiving from said caller responses to those instructions, and means for thereafter initiating a telephone call to said facsimile machine telephone number to establish thereto a second telephone connection and for transmitting the retrieved document in facsimile form over said second telephone connection.

7. The invention of claim 6 further comprising means operative when it has been determined that a facsimile machine is not connected at said caller's end of said caller's telephone connection for providing to said caller machine-generated voice signals instructing said caller relative to the specifying of data identifying said caller, and means for receiving said caller-identifying data from said caller, said initiating and transmitting means transmitting said caller-identifying data along with the requested document.

8. A computer-based document distribution system comprising first circuit means operable under program control for providing audio messages over a telephone line and for interpreting information supplied over the telephone line, second circuit means operable under program control for providing facsimile messages over the telephone line, storage means for storing machine-readable representations of a plurality of document files, and program means a) for operating said first circuit means to answer a telephone call made over a telephone line connected to said system to complete a telephone connection between a caller at the far end of said connection and said system; to provide machine-originated voice signals instructing said caller relative to the ordering of copies of one or more of said documents; to receiving from said caller responses to said voice signals identifying at least a specific one of said documents; and to determine whether a facsimile machine is connected at said caller's end of said caller's telephone connection; b) for retrieving from said storage means at least a first one of said document files associated with said specific one of said documents; and c) for operating said second circuit means when it has been determined that a facsimile machine is connected at said caller's end of said caller's telephone connection to transmit the retrieved document in facsimile form over said caller's telephone connection to said facsimile machine at said caller's end.

9. The computer-based document distribution system of claim 8 further comprising:

program means, operable when it has been determined that a facsimile machine is not connected at said caller's end, for providing machine-originated voice signals instructing said caller relative to the specifying of information identifying a particular facsimile machine; to receive from said caller a response to said voice signals providing said information; for operating said second circuit means, using said information, to establish a second telephone connection to said facsimile machine; and for operating said second circuit means to transmit said retrieved one of said documents in facsimile form over said second telephone connection to said facsimile machine.

10. The computer-based document distribution system of claim 9 wherein:

said program means further provides machine-originated voice signals instructing said caller relative to the specifying of information identifying said caller; to receive from said caller a response to said voice signals providing said caller-identifying data; and operates said second circuit means to transmit in facsimile form, over said caller's telephone connection to said particular facsimile machine, a cover sheet which includes at least said caller-identifying data.

* * * * *